Nov. 26, 1963  J. P. QUIANTHY  3,111,800
SAFETY DEVICE FOR POWER LAWNMOWERS
Filed May 18, 1962

INVENTOR.
JOHN P. QUIANTHY
BY John R. Walker III
Attorney

United States Patent Office 3,111,800
Patented Nov. 26, 1963

3,111,800
SAFETY DEVICE FOR POWER LAWNMOWERS
John P. Quianthy, 4099 Faxon Ave., Memphis, Tenn.
Filed May 18, 1962, Ser. No. 195,749
2 Claims. (Cl. 56—25.4)

This invention relates to a safety device for power lawnmowers.

It is well known that power lawnmowers are dangerous and that there have been many accidents in which a person's foot or hand has been cut off by the cutter blade of the mower, as for example, when the operator of the mower was cutting grass on a hill and accidentally slipped and let the mower roll back over his foot, or for example, when a child has reached under the mower and gotten his hand or finger cut off.

The present invention is directed towards eliminating the above mentioned dangers by providing means for stopping the motor and/or cutter blade of the power mower when any part of a person's or animal's body comes too close to said blade.

Thus, one of the objects of the present invention is to provide, in a power mower, a device which operates responsive to body capacity for stopping the motor and/or cutter blade of the power mower when any part of a person's or animal's body comes too close to said blade.

A further object is to provide such a device which is not affected by objects such as rocks, brick walls, houses and other inanimate objects around which the mower normally comes when a yard is being cut.

A further object is to provide such a device which includes an antenna mounted on said mower adjacent the periphery thereof, relay means, and means coupled to said antenna and said relay means for operating said relay means responsive to the proximity of a person or animal to said antenna.

A further object is to provide blade stopping means releasable from a disengaged position out of the way of the cutter blade of the lawnmower to a stopping position in the path of movement of said cutter blade, and means operably coupled to said stopping means and said relay means for normally holding said stopping means in said disengaged position and for releasing said stopping means to said stopping position responsive to operation of said relay means by the proximity of a person or an animal to said antenna.

A further object is to provide means coupled to said motor and operable responsive to operation of said relay means for stopping said motor.

A further object is to provide such a safety means including means for varying the range in which the device will operate, that is, the nearness at which the person or animal must be in order to cause the motor and/or cutter blade to be stopped.

A further object is generally to improve the design and construction of safety devices for power mowers.

The means by which the foregoing and other objects of the present invention are accomplished and the manner of their accomplishment will be readily understood from the following specification upon reference to the accompanying drawings, in which.

Figure 1:
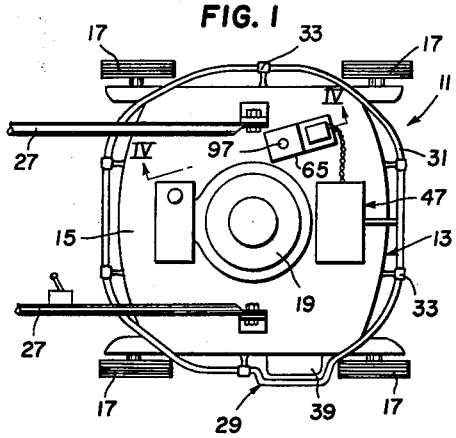
FIG. 1 is a plan view of a power lawnmower with the present invention being incorporated therein.
Figure 2:
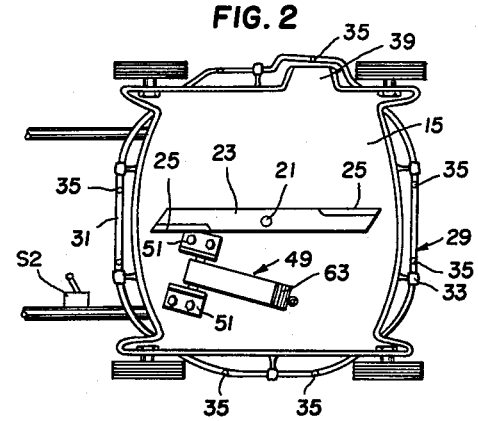
FIG. 2 is a bottom view thereof.

Referring now to the drawings in which the various parts are indicated by numerals, the device 11 of the present invention is shown in the drawings incorporated in a power lawnmower 13 of the well known type which is provided with a frame 15 having the usual wheels 17 so that the mower can be moved along the lawn. In addition, the usual motor 19 is provided, which is shown in the drawings as a gasoline motor, although it may be electrically powered without departing from the spirit and scope of the present invention. Motor 19 has the usual vertical shaft 21 having a suitable cutter or cutter blade 23 fixedly attached adjacent the lower end of the shaft. Cutter blade 23 has the usual sharpened portions 25, which engage the grass for the cutting thereof. In addition, a handle 27 is provided in the usual manner and is pivotally attached to frame 15 for use in pushing the lawnmower.

Figure 3:
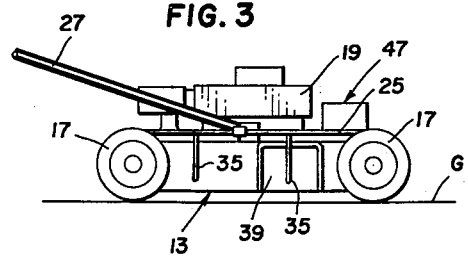
FIG. 3 is a side elevational view thereof.

Having hereinabove described a typical power lawnmower 13 with which the device 11 of the present invention is adapted to be used, the following is a description of device 11 incorporated in combination with mower 13:

Device 11 comprises an antenna 29, which preferably includes a loop portion 31 disposed adjacent the periphery of mower 13 and mounted in spaced relationship to frame 15 as by means of insulators 33. Antenna 29 also preferably includes a plurality of fingers 35 fixedly attached to loop 31 and depending therefrom in spaced relationship around the loop and which fingers terminate in spaced relationship to the ground G, as best seen in FIG. 3. Any number of fingers 35 may be provided, and in the drawings a typical arrangement is shown wherein there are two of the fingers on the front, back, and each of the sides, with one of the fingers depending downwardly across an exhaumst opening 39 usually found on mowers 13 of this type, which exhaust opening permits the grass to be thrown to one side. The actual purpose of antenna 29 will be explained in more detail later in the specification.

Referring now to the electrical system of device 11, transistor $Tr2$ is hooked up as a Hartley oscillator. Junction J1 is connected to the collector $Co2$ of $Tr2$, to capacitor C1, to a tuning coil L1, and to the antenna 29. Junction J2 is connected to capacitor C1, to capacitor C2 and to tuning coil L1. Junction J3 is connected to capacitor C2, to the base $B2$ of $Tr2$, and to junction J4, which in turn is connected to a variable resistor R3. A pair of resistors R1 and R2 are arranged in series across from junction J4 to junction J5. Junction J5 is connected to coil L1 at 41 and is connected to a junction J6. A battery E1 is connected between junction J6 and junction J7. Junction J7 is connected to variable resistor R3 and to a junction J8. Junction J8 is grounded and is also connected to a junction J9. A capacitor C3 and a resistor R4 are connected in parallel from junction J9 to junction J10, which latter junction is connected to a junction J11, which in turn is connected to the emitter $Em2$ of transistor $Tr2$. Junction J11 is also connected to the base $B1$ of transistor $Tr1$. The emitter $Em1$ of transistor $Tr1$ is connected to junction J8 and the collector $Co1$ of transistor $Tr1$ is connected to the coil of a relay 43 which also is connected to junction J6. The switch S1 of relay 43 is connected in series with a battery E2 and the coil L2 of solenoid 45. Relay 43 is arranged so that the switch S1 thereof is closed when the relay is de-energized and opened when the relay is energized. A normally closed defeat switch S2 is preferably also provided in series in the circuit of switch S1, battery E2 and coil L2 so that, if desired, the switch may be opened to defeat or render inoperative device 11. This switch S2 is preferably, though not necessarily, located on handle 27 adjacent the lower part thereof so that the operator has to bend down to operate the switch.

In the heretofore described circuit it will be understood that the frequency of oscillation is determined by the tuning coil L1 and the capacitor C1. Feedback to sustain oscillation is provided by capacitor C2. The variable resistor R3 sets the voltage applied to the base B2 of transistor Tr2 for best operation. The resistors R1 and R2 are provided to protect the transistors. When transistor Tr2 is oscillating, a voltage is developed across the resistor R4 and the capacitor C3, which are located in its emitter circuit. This voltage is applied to the base B1 of transistor Tr1 causing it to conduct and energize relay 43. The above described condition is the normal condition of the circuit and will be the condition of the circuit when there is no body capacity in proximity to antenna 29. When capacity is added to the tuned circuit by a person or animal coming into proximity to the antenna 29, the oscillator quits. With the oscillation dead, no voltage is developed across resistor R4. With no voltage on its base B1, transistor Tr1 ceases to conduct, causing relay 43 to operate to a de-energized position. With the relay 43 operated to the de-energized position, the switch S1 is closed which energizes the solenoid 45 for a purpose later to be described. Typical and preferable values of the various components are as follows: C1, 150 mmfd.; C2, .01 mfd.; R1, 68,000 ohms; R2, 22,000 ohms; R3, 50,000 ohms; R4, 1,000 ohms. The various components heretofore described in the electrical circuit, with the exception of solenoid 45, are preferably located in a housing 47 mounted on frame 15. It will be understood that, if desired, a circuit having tubes rather than transistors, and with corresponding different associated components, can be substituted for the heretofore described transistor circuit without departing from the spirit and scope of the present invention.

Means is preferably provided for stopping cutter blade 23 responsive to operation of relay 43, as heretofore described, upon a person or animal coming close to antenna 29, and said means is preferably as follows:

An arm 49 is pivotally mounted on the underside of frame 15 by brackets 51 fixedly attached to the frame and supporting a shaft 53 on which is pivotally mounted a lug 55 provided at the inner end of arm 49. Arm 49 is preferably of composite construction and includes a tough and fiberlike material 57, of the type generally used for brake shoes, which material is held by rivets 59 to the metal backing plate 61. Arm 49 includes a hook-shaped member 63 fixedly and preferably integrally mounted on fiberlike material 57 and depending therefrom adjacent the outer end of the arm. Member 63 is also a tough fiberlike material embedded in a resilient material as rubber or the like. Arm 49 is disposed above the path of movement of cutter blade 23 and is pivotable between a disengaged or upward position out of the way of the cutter blade, which position is shown in solid lines in FIG. 4, and releasable to a stopping position in the path of movement of the cutter blade, as shown in broken lines in this figure. Arm 49 is positioned so that when the cutter blade 23 engages the arm the cutter blade is substantially perpendicular thereto. It will be understood that when the arm 49 is in said stopping position the hook-shaped member 63 will act as a positive means for preventing rotation of the cutter blade.

Figure 4:
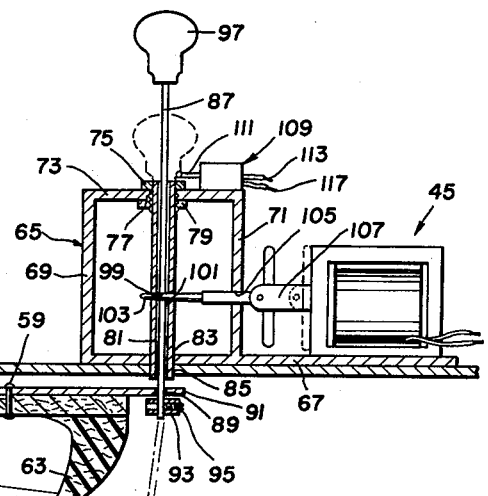
FIG. 4 is a fragmentary sectional view on an enlarged scale taken as on the line IV—IV of FIG. 1, and showing in broken lines the released position of the stopping means in engagement with the cutter blade.
Figure 5:
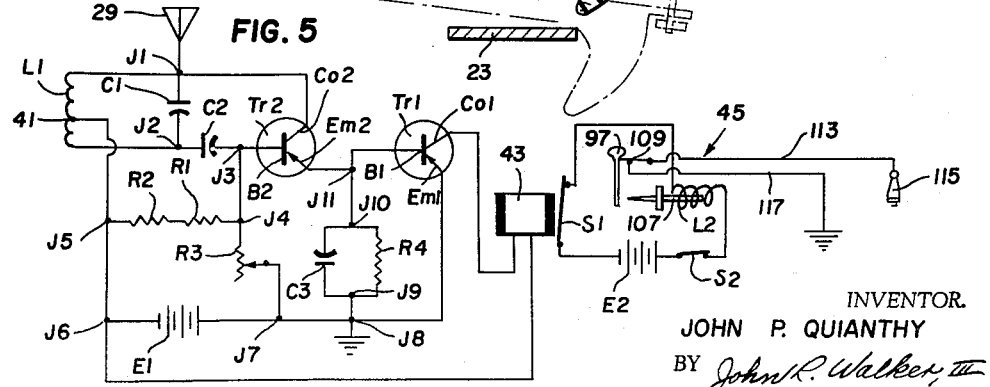
FIG. 5 is a diagrammatic view of the electrical system of the present invention.

A mounting member 65, including a base 67, spaced upstanding members 69, 71 attached to base 67, and a cross piece 73 interconnecting the upper ends of members 69, 71, is mounted on frame 15 and fixedly attached thereto by suitable means. A flanged annular holding member 75 extends down through a hole 77 in cross piece 73 and a nut 79 is threadedly engaged on holding member 75 to clamp the holding member in place, which holding member in turn holds the upper end of a tube 81 that extends therethrough and downwardly through aligned apertures 83, 85 respectively provided in base 67 and frame 15. A flexible wire 87 slidably extends through tube 81 and then downwardly through an aperture 89 in an extension 91 protruding from the outer end of backing plate 61. A clamp 93 of suitable construction which includes a set screw 95 is attached to wire 87 below extension 91 to couple wire 87 to the backing plate and to provide means for adjustment thereof. A knob 97 is provided on the upper end of wire 87 to re-set the mechanism in a manner later to be described. Wire 87 is movable upwardly by upward pull on knob 97 to place the wire in an upward position which, in turn, places arm 49 in the heretofore mentioned disengaged position. With wire 87 in said upward position, the knob 97 is in the position shown in solid lines in FIG. 4. When wire 87 is in said upward position, a transverse bore 99 therethrough is in alignment with a transverse bore 101 in tube 81. The end of a removable pin 103 transversely extends through aligned bores 99, 101 to hold wire 87 and arm 49 in place. Pin 103 extends outwardly through an opening 105 in member 71 and is coupled to the operating arm 107 of solenoid 45. When the coil L2 of solenoid 45 is energized, the operating arm 107 will move to the right, as shown in FIG. 4, to the broken line position, which in turn will withdraw pin 103 from the aligned bores 99, 101 and release wire 87. This will cause the releasing of arm 49 which will permit it to fall down into the heretofore mentioned stopping position.

A switch 109, which is preferably of the well known micro-switch type having an extending finger 111 adapted to be contacted to close the switch, is mounted on cross piece 73 in a position to be contacted by knob 97 to close the switch when the knob is in the downward position shown in broken lines in FIG. 4. A conductor 113 extends from the spark plug 115 of motor 19 to switch 109, and another lead 117 extends from the switch to ground, so that when the switch is closed the spark plug will be shorted to ground to stop the operation of the motor. It will be understood that, if desired, this grounding may be accomplished by grounding the low voltage circuit of the magneto instead of the high voltage or spark plug circuit.

It will be understood that when solenoid 45 is de-energized, the operating arm 107 of the solenoid can be moved manually to the left, as viewed in FIG. 4, so that to re-set the device the knob 97 need only be pulled upwardly until the bores 99, 101 are in alignment and then the pin 103 moved through the bores into the position shown in solid lines in this figure.

From the foregoing description it will be understood that a very efficient and unique safety device is provided for power mowers which eliminates dangers heretofore present of a person or animal getting cut by the blade of the lawnmower. Thus, for example, if a child were to reach inside the lawnmover 13 through the exhaust opening 39 or reach under the frame 15, as soon as the child's hand came into proximity to the lawnmower, as for example within one or two inches of antenna 29, the relay 43 will be operated, which in turn will release arm 49 to the stopping position for stopping cutter blade 23 and will cut off motor 19. It will be understood that the cutter blade 23 will be stopped almost instantaneously since the arm 49 will immediately drop down into the path of the blade and since the blade will not be under power as the motor has been cut off. It will be understood that the operating distance, that is, the distance at which the body must be from antenna 29, can be varied by changing resistor R3. Also, it will be understood that device 11 is not affected by antenna 29 coming near to houses and other inanimate objects since only capacity will operate the device.

Although the invention has been described and illustrated with respect to a preferred embodiment thereof, it is to be understood that it is not to be so limited since changes and modifications may be made therein which are within the full intended scope of this invention as hereinafter claimed.

I claim:
1. The combination with a power mower of the type provided with a wheeled frame having a motor mounted thereon rotatably driving a rotatable cutter blade, of a safety device for stopping said cutter blade, said safety device comprising an antenna mounted from said mower, a tuned oscillator circuit means coupled to said antenna, said tuned oscillator circuit means being detunably responsive to the spaced proximity of a body to said antenna to stop oscillation of said circuit means, relay means, second circuit means coupled to said oscillator circuit means and said relay means for operating said relay means responsive to the detuning of said tuned oscillator circuit means, a stopping arm pivotally mounted from said frame above the path of movement of said cutter blade, said stopping arm including a hook-shaped member adapted to hook over said cutter blade, said stopping arm being pivotable between an upward disengaged position out of the way of said cutter blade and a stopping position in the path of movement of said cutter blade, a vertical tube, means mounting said tube on said frame, a wire slidably extending through said tube, means coupling said wire to said stopping arm adjacent the lower end of said wire, a knob attached to said wire adjacent the upper end thereof for lifting said wire to an upward position, movement of said wire to said upward position being effective to lift said stopping arm to said upward disengaged position, said tube and said wire respectively having bores therethrough with said bores being aligned when said wire is in said upward position, a pin removably received in said aligned bores to hold said wire in said upward position and thereby said stopping arm in said upward disengaged position, solenoid means including an operating arm coupled to said pin, third circuit means coupled to said relay means and said solenoid means for operating said solenoid means responsive to operation of said relay means to retract said operating arm and withdraw said pin from said aligned bores thereby releasing said wire and releasing said stopping arm to said stopping position.

2. The machine of claim 1 in which is included switch means coupled to said motor and operably responsive to release of said wire to stop said motor.

References Cited in the file of this patent
UNITED STATES PATENTS

| | | |
|---|---|---|
| 2,514,407 | May | July 11, 1950 |
| 2,956,633 | Noland | Oct. 18, 1960 |
| 2,973,613 | Hagedorn | Mar. 7, 1961 |
| 2,993,329 | Schmidt | July 25, 1961 |